United States Patent [19]

Freeman et al.

[11] Patent Number: 4,729,091
[45] Date of Patent: Mar. 1, 1988

[54] DIRECTING STORAGE REQUESTS PRIOR TO ADDRESS COMPARATOR INITIALIZATION WITH A REFERENCE ADDRESS RANGE

[75] Inventors: Charles P. Freeman, Round Rock; William M. Johnson, Leander, both of Tex.

[73] Assignee: International Business Machines Corporation, Armonk, N.Y.

[21] Appl. No.: 670,503

[22] Filed: Nov. 13, 1984

[51] Int. Cl.⁴ .................. G06F 15/00; G06F 12/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,030,073 | 6/1977 | Armstrong | 364/200 |
| 4,195,341 | 3/1980 | Joyce et al. | 364/200 |
| 4,236,207 | 11/1980 | Rado et al. | 364/200 |
| 4,475,176 | 10/1984 | Ishii | 364/900 |
| 4,491,914 | 1/1985 | Sujaku | 364/200 |
| 4,497,021 | 1/1985 | Fukuda et al. | 364/200 |
| 4,590,557 | 5/1986 | Lillie | 364/200 |
| 4,591,982 | 5/1986 | Buonomo et al. | 364/200 |
| 4,628,450 | 12/1986 | Sato et al. | 364/200 |

OTHER PUBLICATIONS

Computer Design, Computeach Press, Inc., 1982, by Glen G. Langdon, Jr., pp. 86–87, 198–199, 202–203, 212–213, 214–215, 496–501, 554–557.
IBM TDB vol. 21, No. 10, Mar. 1979, pp. 4100–4101, "Read Only Storage/Random-Access Memory Mode Change" by R. J. Gallagher.

Primary Examiner—Archie E. Williams, Jr.
Assistant Examiner—Thomas C. Lee
Attorney, Agent, or Firm—Thomas E. Tyson

[57] ABSTRACT

An apparatus directs storage requests from a processor through a storage controller to storage. The storage controller contains address comparators which are uninitialized, i.e., they contain no address identifiers. As a result, logic within the storage controller is used to direct these storage requests until the address comparators become initialized. The storage controller directs the first and all subsequent storage requests to a read only storage if the first storage request is for a load, or read, operation. Conversely, the storage controller directs the first and all subsequent storage requests to a random access memory if the first storage request contains a store, or write, operation. An initialization program contained in an I/O device is loaded into the random access memory at the time the first storage request containing a store operation is made. After the address comparators within the storage controller have been initialized, all storage requests are directed to the appropriate location in storage identified by an address accompanying each storage request.

3 Claims, 3 Drawing Figures

DIRECTING STORAGE REQUESTS PRIOR TO ADDRESS COMPARATOR INITIALIZATION WITH A REFERENCE ADDRESS RANGE

DESCRIPTION

1. Technical Field

The present invention relates to data processing systems and more particularly to data processing systems having a central processing unit with a plurality of storage units and/or I/O devices sharing a common system bus.

2. Background Art

It is a common practice in state of the art data processing systems, including those using microprocessor technology, to employ a common data bus for enabling communication between a central processor and a plurality of storage and/or I/O devices. Such I/O devices include disks, displays, and printers. A plurality of controllers enables communication between the central processing unit and the I/O devices or storage units using the common bus. The plurality of controllers are connected to such bus with each controller interfacing between one central processor and at least one storage or I/O device. An address containing an identifier is sent from the central processing unit to the address indicated by the identifier. Such identification is required because all of the plurality of controllers access the same bus.

Each of the plurality of controllers contains an address comparator, for comparing the identifier in the address sent, to a controller identifier contained within the controller. When the two identifiers match, then the address containing the identifier sent from the central processing unit is accepted by that particular controller. In order to enable such identification in present day controllers, the address comparators are usually "hard wired" with a particular identifier so that the identifier associated with a particular controller is fixed and cannot be modified. This fixed identification enables the address comparator within a given controller to readily identify and accept the address sent to it from the central processing unit.

A system having programmable address comparators may provide the user with considerable flexibility. However, such a system presents significant problems in the initialization phase of the system during which the system is brought on line after the power has been turned on. In conventional systems, such initialization involved having the central processing unit (CPU) access an initialization program, usually a read only program stored in a storage unit. Usually such an initialization program was stored in one of the storage units, and subsequent to powering on, the central processing unit would access the appropriate storage unit through its controller by sending an address containing the identifier segment which matched the appropriate controller identifier which had already been hard wired into the controller. The CPU would then carry out the accessed program. However, in a system having programmable address comparators, there could be no hard wired identifier associated with any controller since the identifiers had to be loaded during the initialization of the system.

This initialization problem has been solved in accordance with copending application Ser. No. 670,504, now U.S. Pat. No. 4,688,172, assigned to a common assignee and filed on the same date as the present application. In this latter copending application, initialization apparatus is provided for accessing a stored initialization program through a selected controller. Such selected controller interfaces with a read only initialization program stored in a storage unit with the one selected controller operating as a master controller. Means are contained in such master controller which are selectively activated during initialization so as to enable such master controller to accept all addresses sent from the CPU regardless of the identifier associated therewith. Further, means are provided in each of the other controllers which are also selectively activated during initialization or disabling the programmable comparison means in each of said other controllers so that no addresses are accepted by these other controllers during initialization.

A related problem not addressed by the previously referenced copending application relates to where the storage controller directs storage requests, at system initialization, from the CPU while operating in the mode described in copending application Ser. No. 670,504, now U.S. Pat. No. 4,688,172. In the processing system previously described, there is usually a processor, a storage controller with a read only storage (ROS) and a random access memory (RAM) attached thereto. The system may also include a channel converter with an I/O device such as a hard file, soft file, or local area network attached thereto. Some processing systems may have the initialization program code in ROS from which the processor starts fetching instructions after the system is powered on. Other systems may have initialization code that needs to be loaded from an I/O device (known as an IPL device) into RAM before the processor begins fetching instructions. Before the address comparators are initialized, the storage controller must have the capability to direct the instruction fetches to ROS or direct the initial program load to RAM. After the address comparators have been initialized, they will direct all storage requests to ROS or RAM, as is appropriate.

An example of initializing a digital computer is shown in U.S. Pat. No. 4,030,073. However, this patent does not provide any guidance on how to initialize one or more storage controllers that have programmable address comparators and an IPL device.

SUMMARY OF THE INVENTION

Accordingly, it is an object of this invention to provide an improved data processing system having a central processing unit sharing a common bus with at least one storage and/or I/O device whose access on such bus is controlled by a storage controller.

It is another object of this invention to provide a method and apparatus for directing storage requests through a storage controller during system initialization.

In accordance with these and other objects, there is disclosed a technique or directing storage requests through a storage controller to one or more storage and/or I/O devices before the address comparators within the storage controllers are initialized. Such storage requests will be directed to either ROS or RAM based on the first request received after the data processing system has been powered on. If the first request received is a load, i.e., a read operation, then that request and all subsequent requests are directed to ROS until the address comparators are initialized. If the first request received is a store, i.e., a write operation, then RAM is loaded from an initial program load (IPL) device. Such request and all subsequent requests are directed to RAM until the address comparators are initialized. The directing of all subsequent requests to either ROS or RAM until the address comparators are initialized is controlled by logic within a master storage controller. When the master controller logic is implemented, the master storage controller need not be changed for systems that load an initialization program out of ROS as opposed to one that loads out of RAM.

DESCRIPTION OF THE PREFERRED EMBODIMENT

Figure 1:
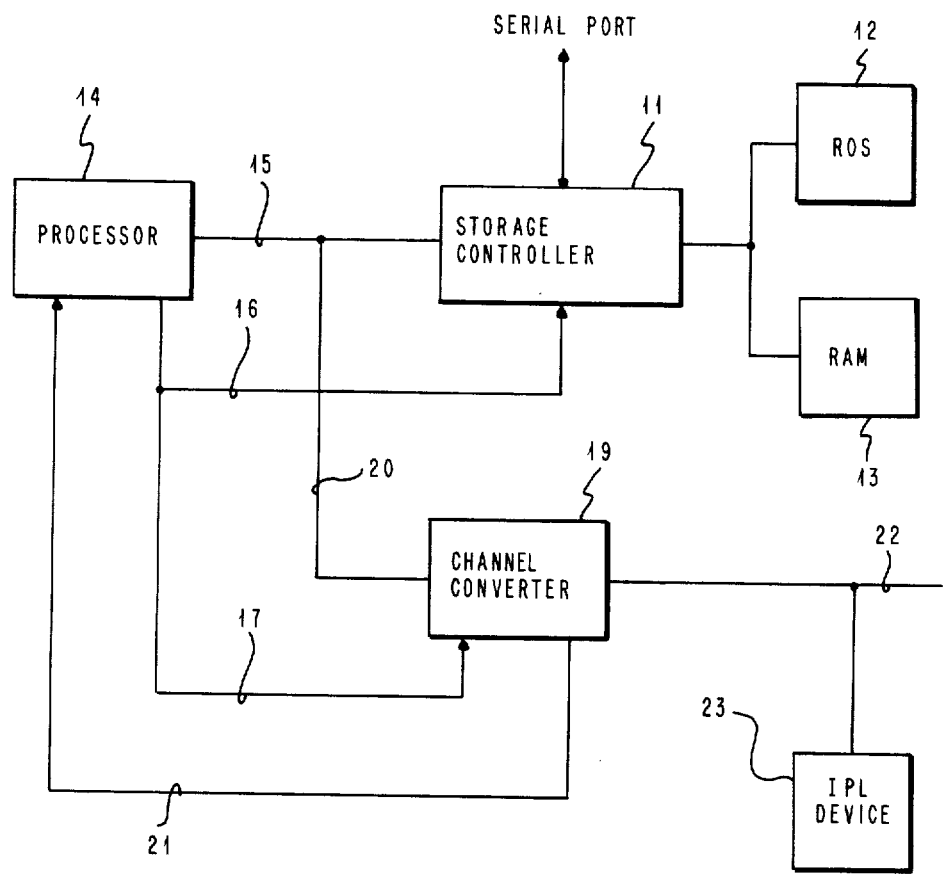
FIG. 1 is a block diagram of a data processing system having a storage controller and a channel converter according to the present invention.

Referring now to FIG. 1, there is shown a data processing system including a storage controller 11 with a read only storage (ROS) 12 and a random access memory (RAM) 13 attached thereto. Processor 14 communicates with storage controller 11 over processor bus 15. The system further includes a channel converter 19 for interfacing I/O channel 22, including initial program load (IPL) device 23, with processor bus 15 using line 20. An IPL READY signal is sent over lines 16 and 17 to storage controller 11 and channel converter 19, respectively. An IPL COMPLETE signal is sent from channel converter 19 over line 21 to processor 14. Processor 14 activates the IPL READY signal when it is ready to start fetching instructions after powering on and waits until the IPL COMPLETE signal is sent by channel converter 19 before instruction fetching begins.

Storage controller 11 contains programmable address comparators (not shown) for directing storage requests from processor 14 sent thereto. After these programmable address comparators have been initialized, any storage requests from processor 14 are sent to the appropriate storage location, indicated by the address associated with the request, which interfaces with storage controller 11. Such location may be either in ROS 12 or RAM 13. However, prior to initialization of the programmable address comparators, storage controller 11 must direct these storage requests from processor 14 to the appropriate one of either ROS 12 or RAM 13, depending on the first request received after the system has been powered on. The operation of storage controller 11 with respect to this latter function will be explained in more detail hereinafter.

Channel converter 19 enables the interfacing of I/O devices, such as IPL device 23, on I/O bus 22 with processor bus 15. IPL device 23 may contain an initialization program which is loaded into RAM 13 at the time the system is powered on. The initialization program may also be permanently stored in ROS 12. Such initialization program contains, among other data, the information needed to program the address comparators contained within storage controller 11. IPL device 23 can be, for example, a hard file, a soft file, or a local area network. The initial program load at the time of system initialization can also occur from a serial port on storage controller 11 as is indicated in FIG. 1.

Figure 2:
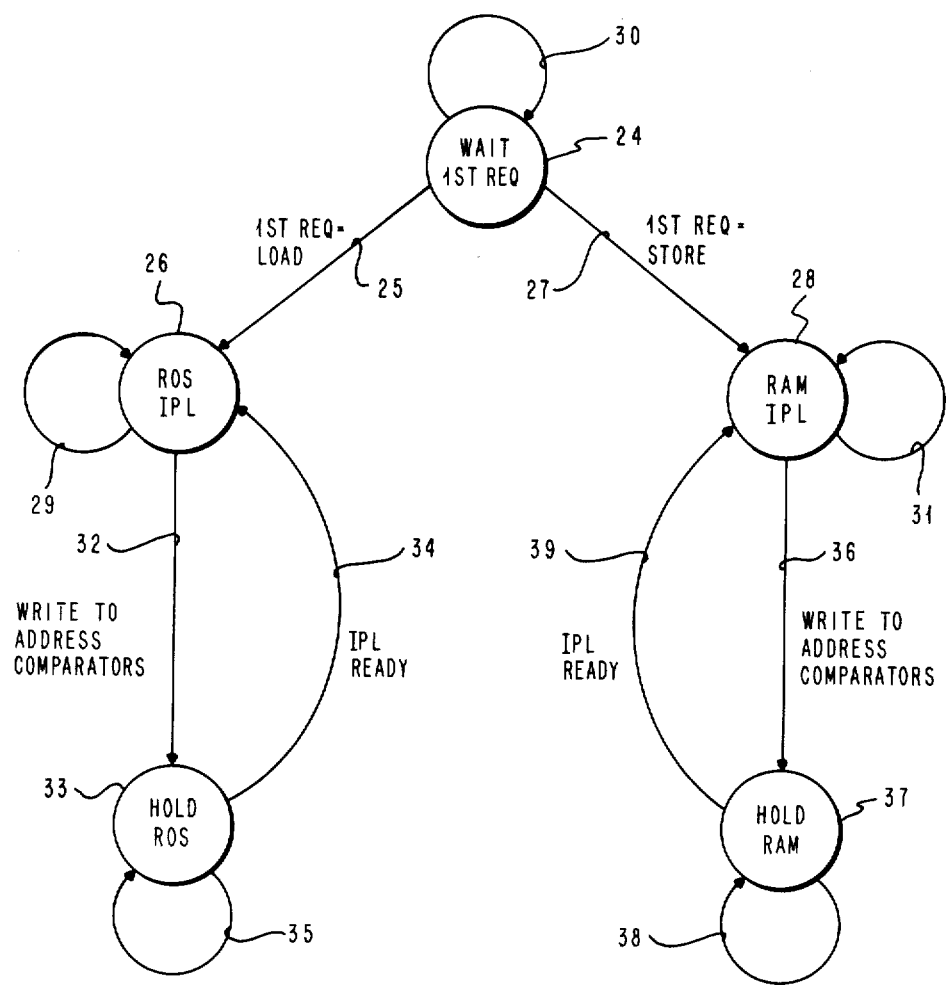
FIG. 2 is a state machine diagram detailing the direction of storage requests to either ROS or RAM.

The state of the data processing system shown in FIG. 1 at any given time is detailed in FIG. 2. State 24 indicates that the system is awaiting the first storage request from processor 14. The system will remain in this state, as indicated by arrow 30, until the first storage request is made. If the first request made is a store, as indicated by signal 27, then the next state that the machine takes is RAM IPL 28 which indicates that RAM 13 is to be loaded with the IPL code in IPL device 23. Arrow 31 indicates that the system stays in RAM IPL state 28 until something occurs which forces the system out of this particular state. Likewise, if the first storage request is a load, as indicated by signal 25, then the system enters ROS IPL state 26 which indicates that the IPL code is read from ROS 12. The system stays in this latter state, as shown by arrow 29, until something happens which forces the system out of this state.

Signal 32 indicates that the address comparators in storage controller 11 have been initialized with addresses located in ROS 12. As a result, the system enters the hold ROS state 33 whereby instructions are fetched from ROS 12 to Processor 14 according to the address contained within the storage request from processor 14. Arrow 35 indicates that the system remains in hold ROS state 33 until IPL READY signal 34 is issued causing the system to move to ROS IPL state 26.

In operation, processor 14 dispatches IPL READY signal 34, on lines 16 and 17, to storage controller 11 and channel converter 17. This IPL READY signal 34 is sent after the system is powered on and also after processor 14 is restarted after a stoppage. Such a stoppage may be caused for system debugging purposes. The issuance of IPL READY signal 34 over lines 16 and 17 indicates that processor 14 is ready to begin fetching instructions. However, the instruction fetching does not begin until an IPL COMPLETE signal is sent over line 21 from channel converter 19 to processor 14. The IPL COMPLETE signal indicates to processor 14 that IPL device 23 has completed loading of the initialization program into RAM 13.

Returning now to FIG. 2, hold RAM state 37 is attained after signal 36 indicates that the address comparators within storage controller 11 have been written with the addresses contained within RAM 13. As shown by arrow 38, the system remains in the hold RAM state 37 until IPL READY signal 39 is sent over lines 16 and 17 to storage controller 11 and channel converter 19, respectively.

As previously indicated, after issuing an IPL READY signal, processor 14 does not begin fetching instructions until an IPL COMPLETE signal is sent from channel converter 19 over line 21 to processor 14. After RAM 13 has been successfully loaded with the initialization program from IPL device 23, channel converter 19 sends IPL COMPLETE signal over line 21 to processor 14. Processor 14 can then begin instruction fetching from RAM 13. If the system has no IPL device and instruction fetching is to occur from ROS 12, then line 21, which indicates IPL COMPLETE, can be held active so that processor 14 will start instruction fetching immediately after it activates IPL READY signal 34 on lines 16 and 17.

Figure 3:
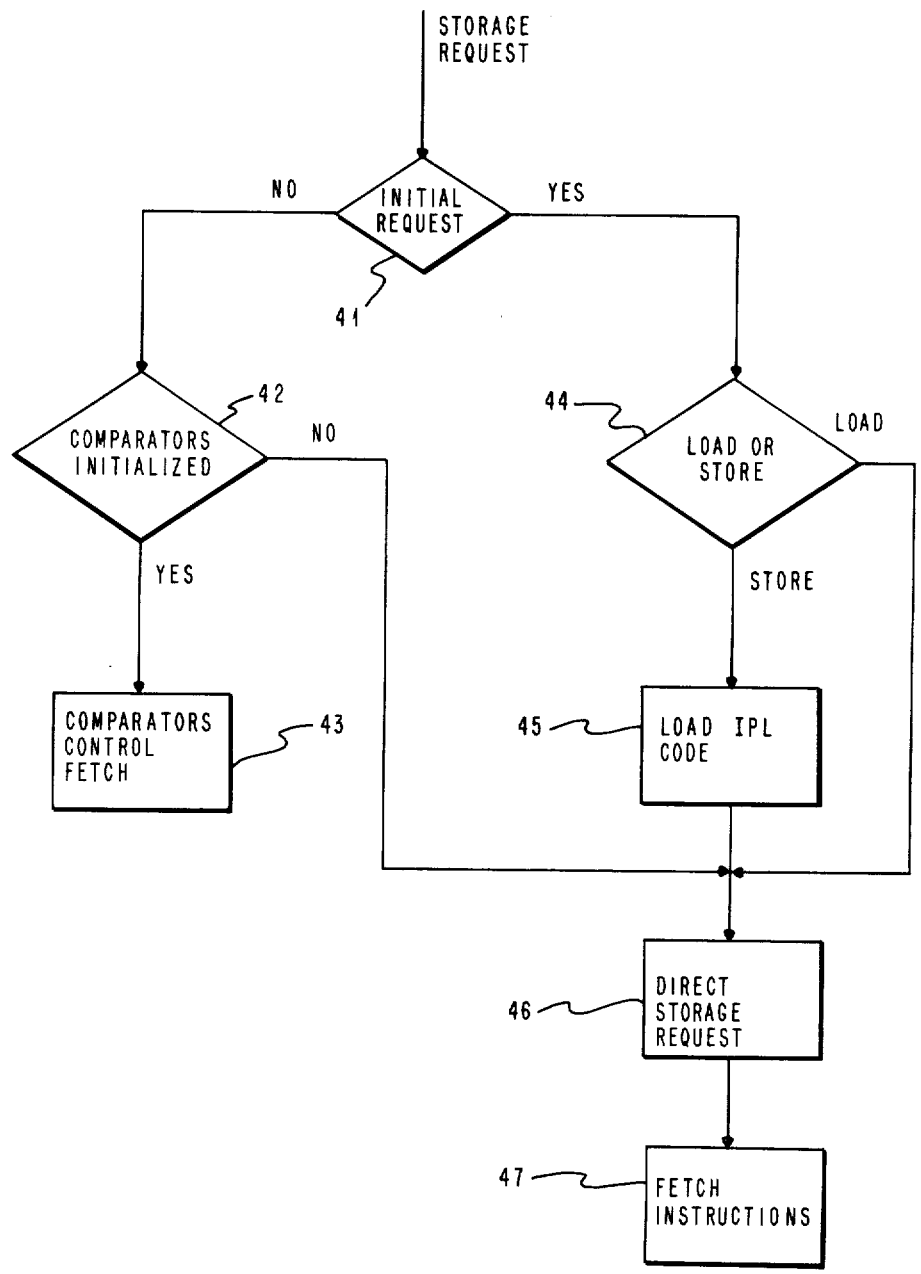
FIG. 3 is a flow diagram of the operation of a data processing system according to the present invention.

The flow diagram shown in FIG. 3 details the operation of the system shown in FIG. 1. When a storage request is sent from processor 14, a decision must be made, as shown in decision block 41, as to whether or not this request is the initial storage request. If the request is the first request, then as indicated in block 44, a decision must be made as to whether or not this is a load or a store request. If the first request is a store, then the IPL code must be loaded into RAM 13 as indicated in block 45. However, if the first request is a load, thus indicating that the IPL code is in ROS 12, then as shown in block 46, storage controller 11 may begin directing the storage request to its appropriate location in ROS 12. At the completion of the loading of the IPL code into RAM 13, storage controller 11 directs the storage request to RAM 13. This is also shown by block 46. At this time, processor 14 may begin fetching instructions as indicated in block 47.

If the storage request were not the initial one, then a subsequent decision must be made as to whether or not the address comparators within storage controller 11 have been initialized. If the address comparators have not been initialized, then the "no" branch of decision block 14 directs operation to block 46, which directs the storage request to the appropriate one of either ROS 12 or RAM 13 depending on whether or not the initial storage request was a load or a store. As indicated previously until the address comparators are initialized, all subsequent storage requests will be sent to the same one of either ROS 12 or RAM 13 that the first storage request was sent to.

If the "yes" branch of decision block 42 is reached, then as shown in block 43, the address comparators within storage controller 11 direct the fetching of instructions from their appropriate location in either ROS 12 or RAM 13. The address comparators within storage controller 11 direct the storage request to its appropriate address location.

While the present invention has been described with respect to a preferred embodiment, it will be recognized by those skilled in the art that various modifications and variations of the present invention will be apparent to those skilled in the art without departing from the spirit and scope of the invention. Specifically, it will be recognized that the present invention may be embodied in a system, in either hardware or software, having a storage controller with programmable address comparators that power on or reset to uninitialized values.

What is claimed is:

1. In a data processing system including a storage controller for controlling storage requests, requiring either a load or a store operation, from a processor to storage in accordance with a reference address range, said storage controller comprising:
   address comparator means for directing each of said storage requests to a location in said storage identified by an address corresponding to each of said storage requests, said address comparator means becoming operative upon being initialized by being provided with said reference address range;
   a first means for directing, while said address comparator means is inoperative, the first one of said storge requests to a first location in said storage if said first one requires a load operation, said means directing said first one to a second location in said storage if said first one requires a store operation; and,
   a second means for directing the remainder of said storage requests, unit address comparator means is initialized and operative, to the location in said storage to which said first one of said storage requests was directed.

2. The data processing system of claim 1 further comprising:
   an I/O channel;
   an I/O device, containing an initialization program, on said I/O channel;
   a channel converter for interfacing said I/O channel with said storage controller and said processor; and,
   means, connected to said loading means and said processor, for loading said initialization program from said I/O device into said second location in said storage if said first one of said storage requests requires a store operation.

3. The data processing system of claim 2 further comprising means, connected to said loading means and said processor, for delaying instruction fetching from said storage to said processor in response to said storage requests until said initialization program has been loaded into said second location in said storage.

* * * * *

UNITED STATES PATENT AND TRADEMARK OFFICE
CERTIFICATE OF CORRECTION

PATENT NO. : 4,729,091

DATED : March 1, 1988

INVENTOR(S) : C. P. Freeman et al

It is certified that error appears in the above-identified patent and that said Letters Patent is hereby corrected as shown below:

Col. 6, line 20, delete "unit" and insert --until said--.

Signed and Sealed this

Eighth Day of October, 1991

Attest:

HARRY F. MANBECK, JR.

*Attesting Officer*    *Commissioner of Patents and Trademarks*